United States Patent
Sellers

(10) Patent No.: US 10,544,824 B2
(45) Date of Patent: Jan. 28, 2020

(54) BALL JOINT ASSEMBLY

(71) Applicant: Federal-Mogul Motorparts Corporation, Southfield, MI (US)

(72) Inventor: Roger Sellers, Arnold, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 323 days.

(21) Appl. No.: 15/455,302

(22) Filed: Mar. 10, 2017

(65) Prior Publication Data
US 2018/0258982 A1 Sep. 13, 2018

(51) Int. Cl.
*F16C 11/06* (2006.01)

(52) U.S. Cl.
CPC ...... *F16C 11/0628* (2013.01); *F16C 11/0685* (2013.01)

(58) Field of Classification Search
CPC ... F16C 11/06; F16C 11/0614; F16C 11/0619; F16C 11/0623; F16C 11/0628; F16C 11/0633; F16C 11/0638; F16C 11/0652; F16C 11/0685; F16C 11/069; F16C 11/08; F16C 11/083; F16C 11/086; Y10T 403/32713; Y10T 403/32737; Y10T 403/32754; Y10T 403/32762; B60G 2204/416; B60G 7/005
See application file for complete search history.

(56) References Cited

U.S. PATENT DOCUMENTS

| | | | |
|---|---|---|---|
| 2,018,365 A | 12/1933 | Klages et al. | |
| 3,272,541 A | 9/1966 | Latzen | |
| 3,329,453 A * | 7/1967 | Patton | F16C 11/08 280/93.508 |
| 3,944,376 A | 3/1976 | Hata | |
| 4,003,666 A * | 1/1977 | Gaines | F16C 11/0671 277/635 |
| 4,231,673 A * | 11/1980 | Satoh | F16C 11/0633 403/125 |
| 4,386,869 A | 6/1983 | Smith | |
| 4,493,512 A | 1/1985 | Smith, Jr. | |

(Continued)

FOREIGN PATENT DOCUMENTS

GB 797545 A 7/1958

OTHER PUBLICATIONS

International Search Report, dated May 26, 2018 (PCT/US2018/021033).

*Primary Examiner* — Jonathan P Masinick
(74) *Attorney, Agent, or Firm* — Robert L. Stearns; Dickinson Wright PLLC

(57) ABSTRACT

The ball joint assembly includes a housing with an inner wall that surrounds an axially extending open bore. A ball portion of a ball stud is received in the open bore of the housing, and a shank portion of the ball stud projects out of the open bore. A pair of bearings are disposed in the inner bore of the housing and are interposed between the ball portion and the inner wall. Each bearing has a curved bearing surface which slidably contacts the ball portion for allowing the ball stud and the housing articulate relative before use. Each bearing also has an outer surface that slidably contacts the inner wall. A pair of biasing elements bias the bearings in opposite directions against the ball portion of the ball stud such that the ball stud is movable relative to the housing in the axial direction before use of the assembly.

14 Claims, 7 Drawing Sheets

(56) References Cited

U.S. PATENT DOCUMENTS

| 6,422,779 B1 | 7/2002 | Spagnuolo |
| 8,714,862 B2 | 5/2014 | Mevorach et al. |
| 9,296,271 B2 | 3/2016 | Mevorach et al. |
| 2014/0205366 A1 | 7/2014 | Mevorach et al. |

* cited by examiner

BALL JOINT ASSEMBLY

BACKGROUND OF THE INVENTION

1. Field of the Invention

The present invention relates generally to ball and socket assemblies and more particularly to ball joints for the suspension systems of vehicles.

2. Related Art

Vehicle steering and suspension assemblies typically include multiple ball joint assemblies for interconnecting the various components with one another. Each such ball joint assembly has a housing with an open bore and a stud which is partially disposed in the open bore and extends outwardly therefrom. One or more bearings are interposed in the open bore between the housing and stud. The housing and stud are fixed with different steering or suspension components.

In some applications, the stud may be urged in one axial direction during installation, thereby binding the stud against one of the bearings. This condition may result in a phenomenon typically known as "memory steer" whereby the vehicle wants to keep turning in a direction after completing a turn in the same direction.

SUMMARY OF THE INVENTION AND ADVANTAGES

One aspect of the present invention is related to a ball joint assembly which includes a housing with an inner wall that surrounds an axially extending open bore. The ball joint assembly further includes a ball stud with a ball portion, which is received in the open bore of the housing, and a shank portion, which projects out of the open bore through an open end of the housing. A pair of bearings are disposed in the inner bore of the housing and are interposed between the ball portion of the ball stud and the inner wall. Each of the bearings has a curved inner bearing surface which is in surface-to-surface contact with the ball portion of the ball stud for allowing the ball stud and the housing to rotate and articulate relative to one another before use. Each of the bearings also has an outer bearing surface that is in slidable contact with the inner wall of the housing. The ball joint assembly further includes a pair of biasing elements which bias the bearings in opposite axial directions against the ball portion of the ball stud such that the ball stud is movable relative to the housing in the axial direction before use of the ball joint assembly.

The ball joint assembly is advantageous in that it may be manufactured cost effectively and in that it allows the ball stud to float axially during installation onto a vehicle suspension system to prevent the ball joint assembly from binding up, which can result in memory steer. That is, the ball joint assembly is not only cost effective but it also offers improved steering and handling performance than other known ball joint assemblies.

According to another aspect of the present invention, the ball portion of the ball stud is in contact with the inner wall and is slidable in the axial direction along the inner wall before use of the ball joint assembly.

According to yet another aspect of the present invention, housing includes a bearing sleeve which defines the inner wall.

According to still another aspect of the present invention, the biasing elements are made of an elastically compressible material.

According to a further aspect of the present invention, the housing has a lower wall at one open end of the open bore, and one of the biasing elements is sandwiched between a flat surface of one of the bearings and the lower wall of the housing.

According to yet a further aspect of the present invention, the housing is deformed to present a radially inwardly extending lip opposite of the lower wall, and one of the biasing elements is sandwiched between a flat surface of one of the bearings and the lip of the housing.

According to still a further aspect of the present invention, the inner wall of the housing has a constant diameter along its entire length.

According to another aspect of the present invention, the ball joint assembly further includes a cover plate which is secured with the housing, and one of the biasing elements is sandwiched between the cover plate and one of the bearings.

Another aspect of the present invention is related to a method of making a ball joint assembly. The method includes the step of preparing a housing that has an inner wall which surrounds an open bore and which extends along a central axis. The method proceeds with the step of inserting a first biasing element into the open bore. The method continues with the step of inserting a first bearing that has a first curved bearing surface and a first outer surface into the open bore such that the first outer surface is in slidable contact with the inner wall of the housing. The method proceeds with the step of inserting a ball portion of a ball stud into the open bore such that an exterior surface of the ball portion is in slidable contact with the first curved bearing surface of the first bearing. The method continues with the step of inserting a second bearing that has a second curved bearing surface and a second outer surface into the inner bore such that the second curved bearing surface is in slidable contact with the exterior surface of the ball portion and such that the second outer surface is in slidable contact with the inner wall of the housing. The method proceeds with the step of inserting a second biasing element into the open bore. The method continues with the step of at least partially closing an open end of the housing. The method continues with the step of compressing the first and second biasing elements to bias the first and second curved bearing surfaces of the first and second bearings against the exterior surface of the ball portion of the ball stud. Immediately after the at least partial closing step, the ball stud is capable of movement relative to the housing in an axial direction.

According to another aspect of the present invention, the housing has a main body piece, and the method further includes the step of inserting a bearing sleeve of the housing into an opening in the main body piece.

According to yet another aspect of the present invention, the step of at least partially closing an open end of the housing is further defined as swaging one axial end of the housing to present a radially inwardly extending lip.

According to still another aspect of the present invention, the step of closing an open end of the housing causes the step of compressing the first and second biasing elements.

According to a further aspect of the present invention, the step of at least partially closing an open end of the housing is further defined as pressing a cover plate into a groove formed into the inner wall of the housing.

According to yet a further aspect of the present invention, the first and second biasing elements are made of an elastically compressible material.

According to still a further aspect of the present invention, the method further includes the step of sliding the ball portion of the ball stud along the inner wall of the housing.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

DETAILED DESCRIPTION OF THE ENABLING EMBODIMENTS

Figure 1:
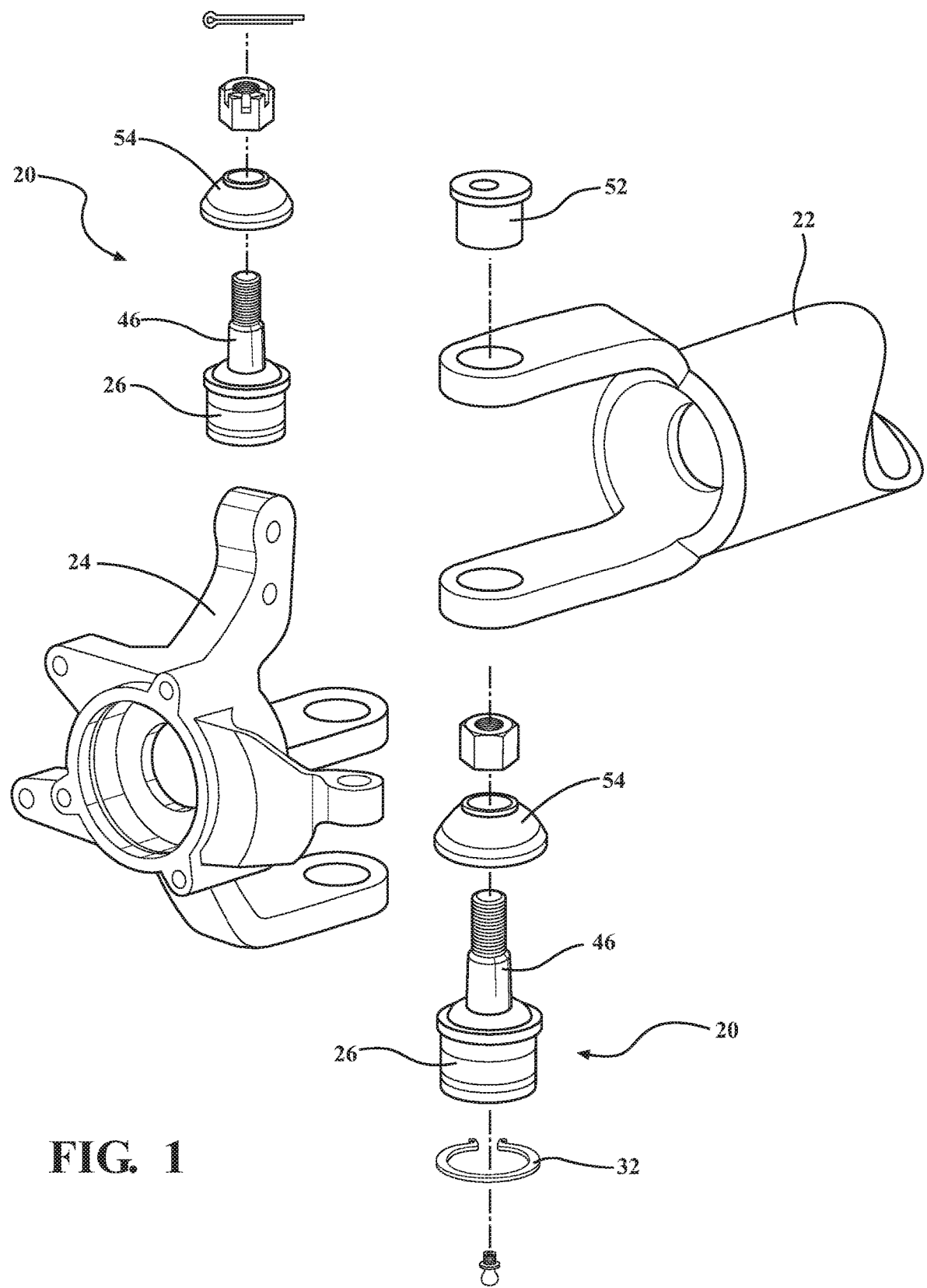
FIG. 1 is an exploded view of an exemplary vehicle suspension assembly including a pair of ball joint assemblies constructed according to one aspect of the present invention.

Referring to the Figures, wherein like numerals indicate corresponding parts throughout the several views, a vehicle suspension system which includes an exemplary pair of ball joint assemblies 20 constructed in accordance with one aspect of the present invention is generally shown in FIG. 1. As shown, the exemplary ball joint assemblies 20 are configured for operably connecting an axle 22 with a knuckle 24 to maintain the knuckle 24 at a predetermined fixed angle relative to the axle 22, thereby allowing the camber and caster of a wheel attached thereto to be precisely set and to allow the knuckle 24 to pivot relative to the axle about an axis when turning the vehicle. However, it should be appreciated that the ball joint assembly 20 could find uses in a range of both automotive and non-automotive applications.

Figure 2:
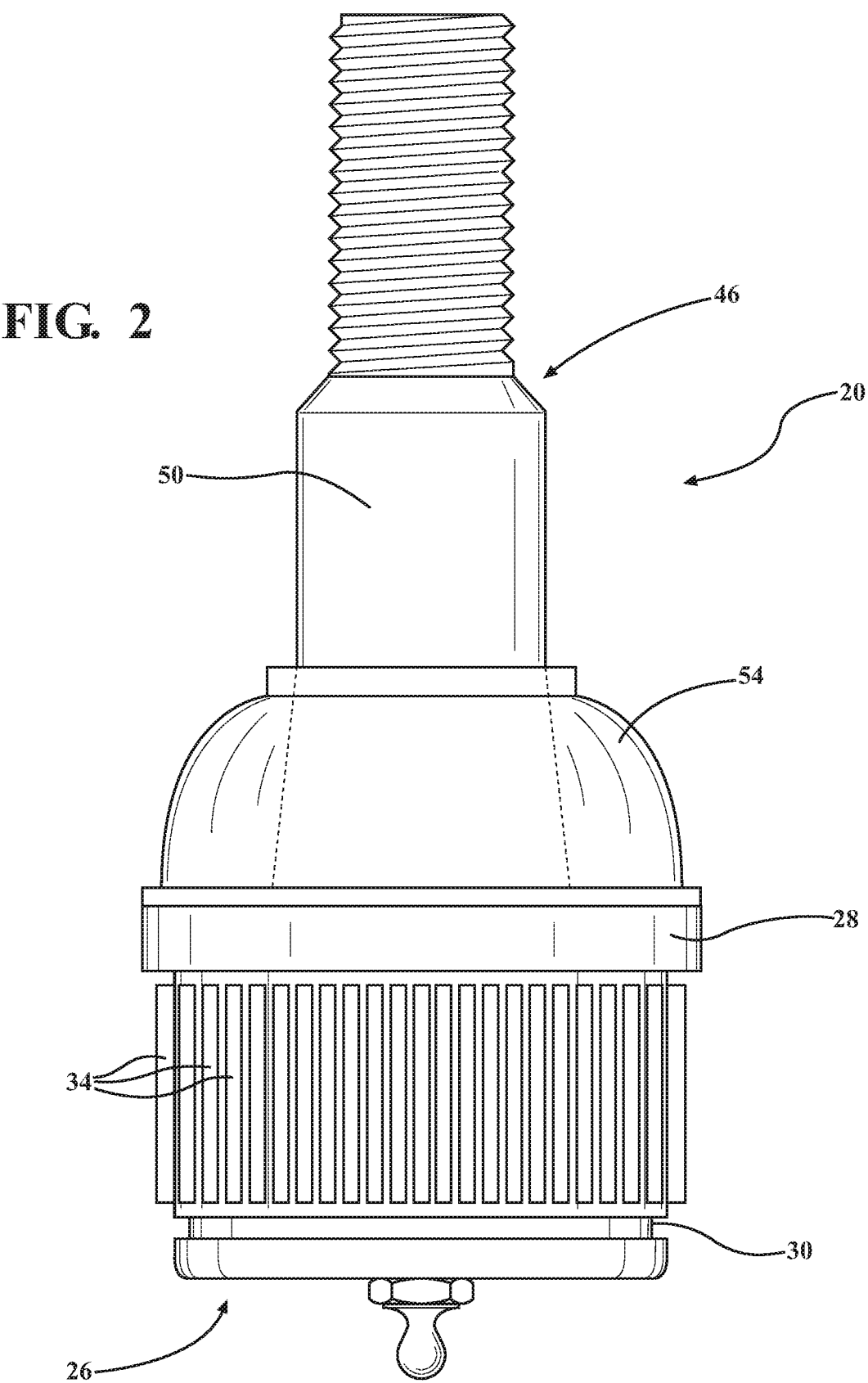
FIG. 2 is a front elevation view of a first exemplary embodiment of a ball joint assembly constructed according to one aspect of the present invention.
Figure 3:
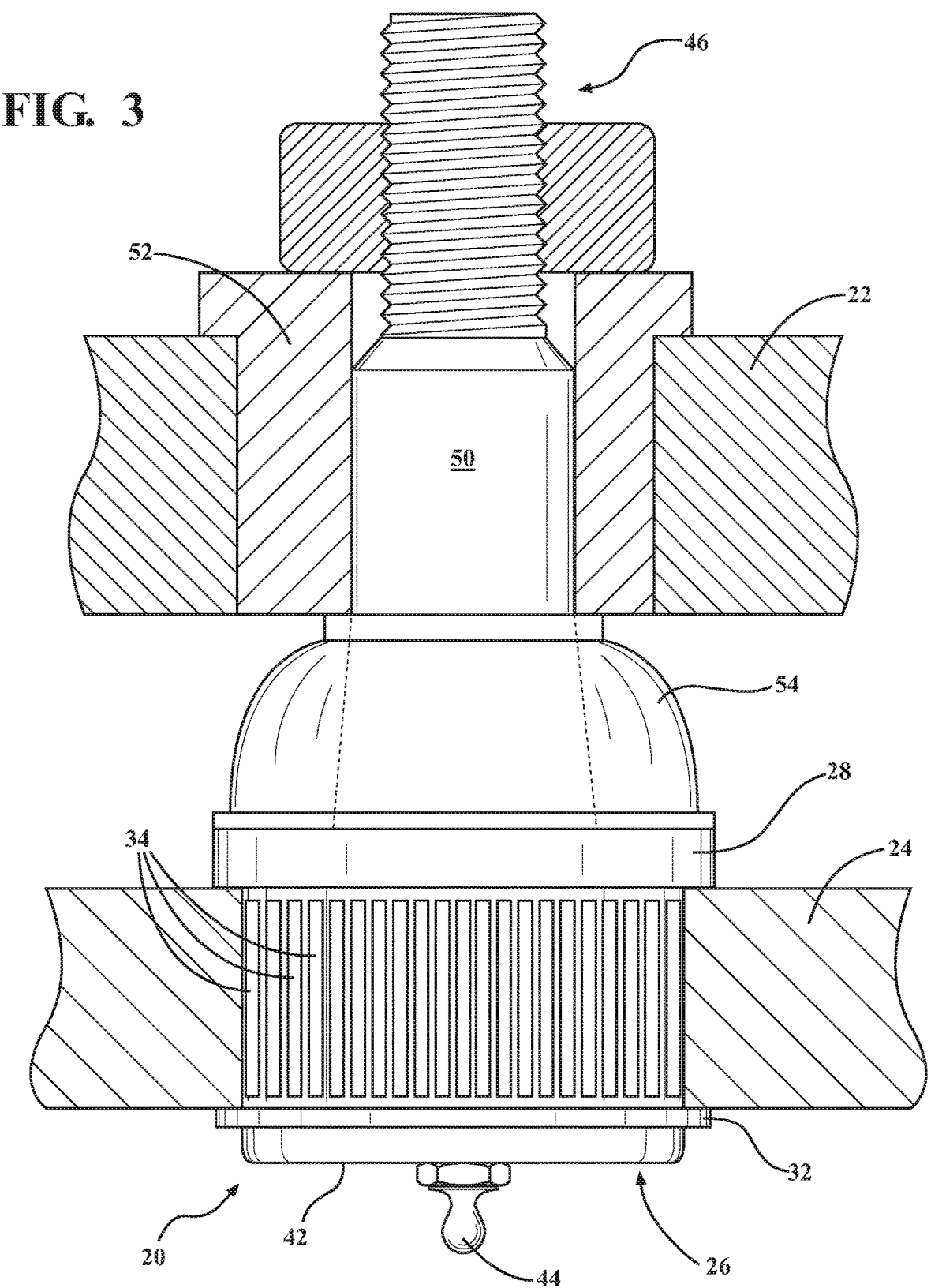
FIG. 3 is a view of the ball joint assembly of FIG. 2 in an installed condition with the ball joint assembly being in elevation and the remaining components being in cross-section.

Referring now to FIGS. 2 and 3, in the exemplary embodiment, the ball joint assembly 20 is of a cartridge-style construction in that it has a housing 26 which is configured to be press-fit into a first opening on the knuckle 24. The housing 26 has an outer wall that presents a radially outwardly extending flange 28 which defines a stopping point for press-fitting the housing 26 into first opening of the knuckle 24. The outer wall also presents a circumferentially extending groove 30 which is spaced axially from the radially outwardly extending flange 28 for receiving a retainer ring 32 which locks the housing 26 with the knuckle 24. The outer wall of the exemplary housing also has a plurality of circumferentially spaced apart knurls 34 for improving the press-fitting connection between the housing 26 and the knuckle 24.

Figure 4:
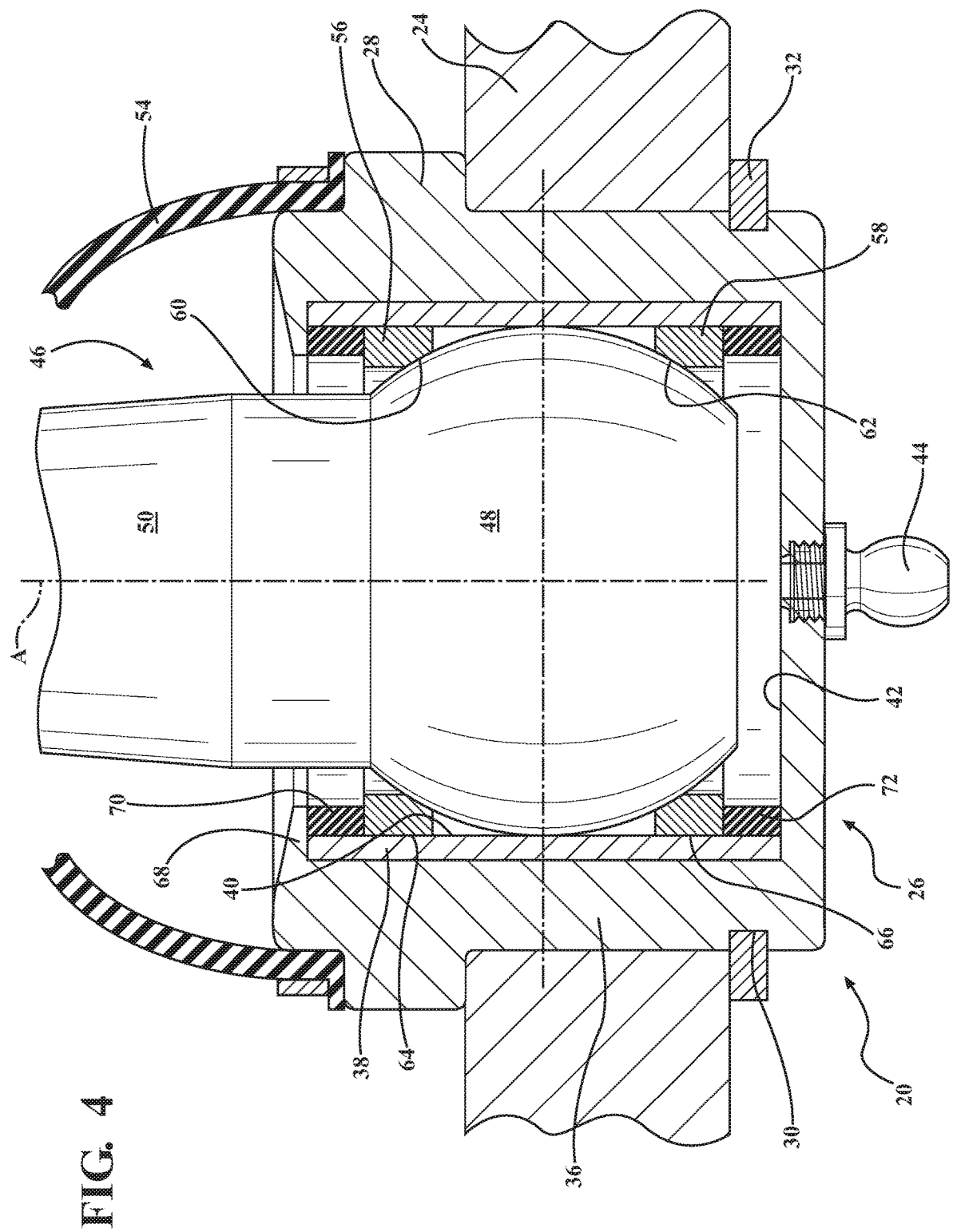
FIG. 4 is a fragmentary view of the ball joint assembly of FIG. 2 in an installed condition and showing a ball stud and a Zerk fitting in elevation and the remaining components in cross-section.

Referring now to FIG. 4, in the first exemplary embodiment of the ball joint assembly 20, the housing 26 is composed of two pieces including a main body piece 36 and a bearing sleeve 38 which is press-fit into an opening of the main body piece 36. The bearing sleeve 38 has an inner wall 40 which surrounds an open bore that extends along a central axis A from a lower wall 42 of the main body piece 36 to an open end. That is, the open bore has an at least substantially closed end and an open end. In this embodiment, the inner wall 40 has a cylindrical shape in that it has a constant diameter along its axial length from the closed end to the open end. The lower wall 42 presents a lubricant opening which receives a Zerk fitting 44 for conveying a lubricant (such as grease) into the open bore of the housing 26 both during initial assembly and during routine maintenance of the ball joint assembly 20.

Both the main body piece 36 and the bearing sleeve 38 of the housing 26 are preferably made of metal, such as iron, steel, a steel alloy, aluminum, or an aluminum alloy and are preferably shaped through casting, forging and/or machining. Specifically, in the first exemplary embodiment, the main body piece 36 is made of non-gas carbonized AISI 1018 steel, and the bearing sleeve 38 is made of gas carbonized AISI 1018 steel such that the main bearing sleeve 38 is of a harder material than the main body piece 36 to absorb forces and resist wear while allowing the relatively softer main body piece 36 to be deformed during a swaging operation which is described in further detail below.

The ball joint assembly 20 further includes a ball stud 46 with a ball portion 48 and a shank portion 50. The ball portion 48 is received in the open bore of the housing 26, and the shank portion 50 projects out of the housing 26 through the open end for connection with the axle 22. The ball portion 48 of the ball stud 46 has a semi-spherically curved exterior surface with an outer diameter that is similar to the constant diameter of the inner wall 40 of the housing 26 such that an equator of the ball portion 48 is in direct contact or near contact with the inner wall 40 three hundred and sixty degrees (360°) around the central axis A. This allows radial loads to be directly transferred between the ball stud 46 and the housing 26 during operation of the vehicle. However, the contact between the ball portion 48 and the inner wall 40 is loose enough to allow the ball stud 46 to rotate relative to the housing 26 about the central axis A during operation of the vehicle. It should also be appreciated that, depending on the orientation of the ball stud 46 when the ball joint assembly 20 is installed on the vehicle, the contact between the ball portion 48 and the inner wall 40 may not be along the equator of the ball portion 48.

Referring back to FIG. 3, in the exemplary embodiment, a bushing 52 is interposed between the shank portion 50 of the ball stud 46 and the opening of the axle 22. The bushing 52 has an eccentrically located opening for allowing the camber of the wheel attached to the knuckle 22 to be adjusted by rotating the bushing 52 relative to the knuckle 22. The ball stud 46 is preferably made as a single piece of metal, such as steel or an alloy steel, but any suitable material may be employed, and the ball stud 46 may be shaped through any suitable process. A dust boot 54, which is preferably made of an elastomeric material such as rubber, is sealed against the outer wall of the housing 26 and the shank portion 50 of the ball stud 46 to contain the lubricant within and keep contaminants out of the inner bore. The dust boot 54 may take any suitable configuration.

A pair of bearings 56, 58 (hereinafter referred to as an upper bearing 56 and a lower bearing 58) are disposed in the inner bore of the housing 26 and are interposed between the ball portion 48 of the ball stud 46 and the inner wall 40 of the housing 26. Each of the bearings 56, 58 has a curved inner bearing surface 60, 62 which is in slidable contact with the exterior surface of the ball portion 48 of the ball stud 46 for allowing the ball stud 46 and housing 26 to rotate and articulate relative to one another, for example, when attaching the ball joint assembly 20 with the vehicle's axle 22 and knuckle 24. As shown, the curved upper bearing surface 60 is in surface-to-surface contact with an upper hemisphere of the ball portion 48, and the curved lower bearing surface 62 is in surface-to-surface contact with a lower hemisphere of the ball portion 48.

The upper and lower bearings 56, 58 are spaced axially from one another within the open bore of the housing by a gap, and the contact between the exterior surface of the ball portion 48 of the ball stud 46 and the inner wall 40 occurs within this gap. The upper and lower bearings 56, 58 and/or the exterior surface of the ball portion 48 of the ball stud 46 may be provided with one or more lubricant grooves (not shown) for improving the flow of lubrication within the open bore. The upper and lower bearings 56, 58 are preferably identical in shape and construction to reduce manufacturing costs through economies of scale. The upper and lower bearings 56, 58 are preferably made of metal, such as steel or an alloy steel but could alternately be made of any suitable material including certain plastics and may be shaped through any suitable process or processes.

Each of the upper and lower bearings 56, 58 also has an outer bearing surface 64, 66 that has a generally constant outer diameter which is slightly less than the diameter of the inner wall 40 of the housing 26 such that the inner wall 40 constrains the upper and lower bearings 56, 58 in a radial direction but allows the upper and lower bearings 56, 58 to float or move in the axial direction relative to the housing 26.

In the first exemplary embodiment of the ball joint assembly 20, a top edge of the housing 26 adjacent the open end of the open bore is deformed (for example, through swaging) to present a radially inwardly extending lip 68 which partially closes the open end to capture the bearing sleeve 38; the upper and lower bearings 56, 58; and the ball portion 48 of the ball stud 46 in the inner bore. After the swaging operation is completed, the bearing sleeve 38 extends in the axial direction a fixed length from the lower wall 42 to the lip 68 of the housing 26.

The ball joint assembly 20 further includes a pair of annularly shaped biasing elements 70, 72 (hereinafter referred to as an upper biasing element 70 and a lower biasing element 72) which are disposed in the inner bore of the housing 26 and which self-center the ball stud 46 in an axial direction before and during installation of the ball joint assembly 20 in the vehicle. Specifically, the lower biasing element 72 is sandwiched between and in direct contact with the lower wall 42 of the housing 26 and a flat lower surface of the lower bearing 58, and an upper biasing element 70 is sandwiched between and in direct contact with the lip 68 of the housing 26 and a flat upper surface of the upper bearing 56. In this exemplary embodiment of the ball joint assembly 20, the upper and lower biasing elements 70, 72 are made of an elastomeric and compressible material and are slightly elastically compressed during the swaging operation at the open end of the housing 26. Alternately, the upper and lower biasing elements 70, 72 could be metal springs, such as wave springs.

When compressed after the swaging operation, the lower biasing element 72 imparts an upward biasing force which biases the curved lower bearing surface 62 of the lower bearing 58 against the lower hemisphere of the ball portion 48, and the upper biasing element 70 imparts a downward biasing force to bias the curved upper bearing surface 60 of the upper bearing 56 against the upper hemisphere of the ball portion 48. The biasing forces from the biasing elements 70, 72 counter one another to bias the ball stud 46 towards a resting location, which is shown in FIG. 4 and to allow the ball stud 46 to move axially relative to the housing 26 before use. The biasing elements 70, 72 are preferably low load biasing elements with equal or substantially equal spring constants such that minimal force is required to move the ball stud 46 axially relative to the housing 26 and such that movement results in a minimal force discrepancy between the biasing elements 70, 72. That is, when the ball stud 46 is displaced axially form the resting location, both the increased biasing force from further compressing one of the biasing elements 70, 72 and the reduced biasing force from uncompressing the other biasing element 70, 72 will be minimal. As such, only a slight increase in torque will result to rotate the ball stud 46 and housing 26 relative to one another will result.

Figure 5:
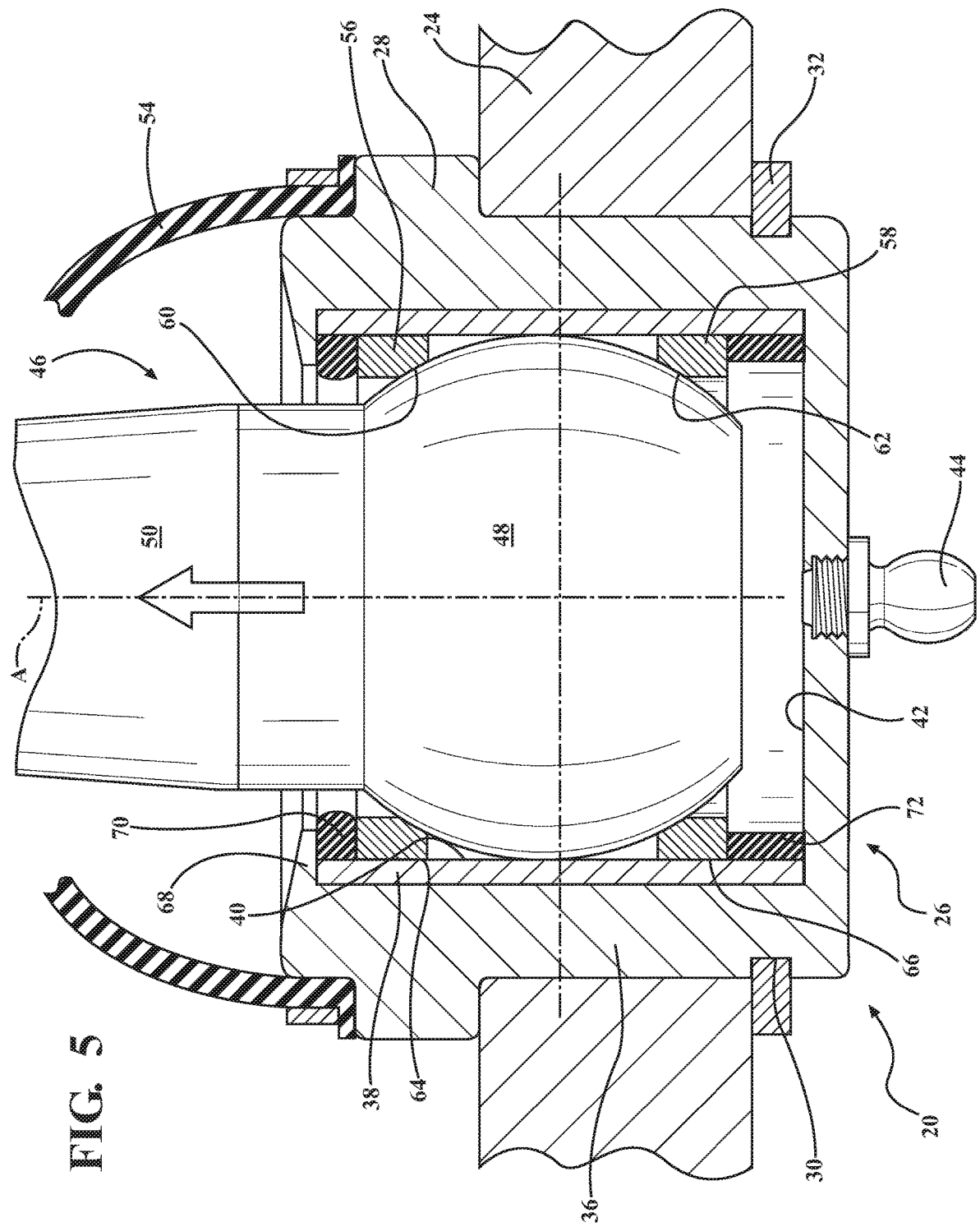
FIG. 5 is a view similar to FIG. 4 but showing a ball stud being moved relative to a housing in one axial direction.
Figure 6:
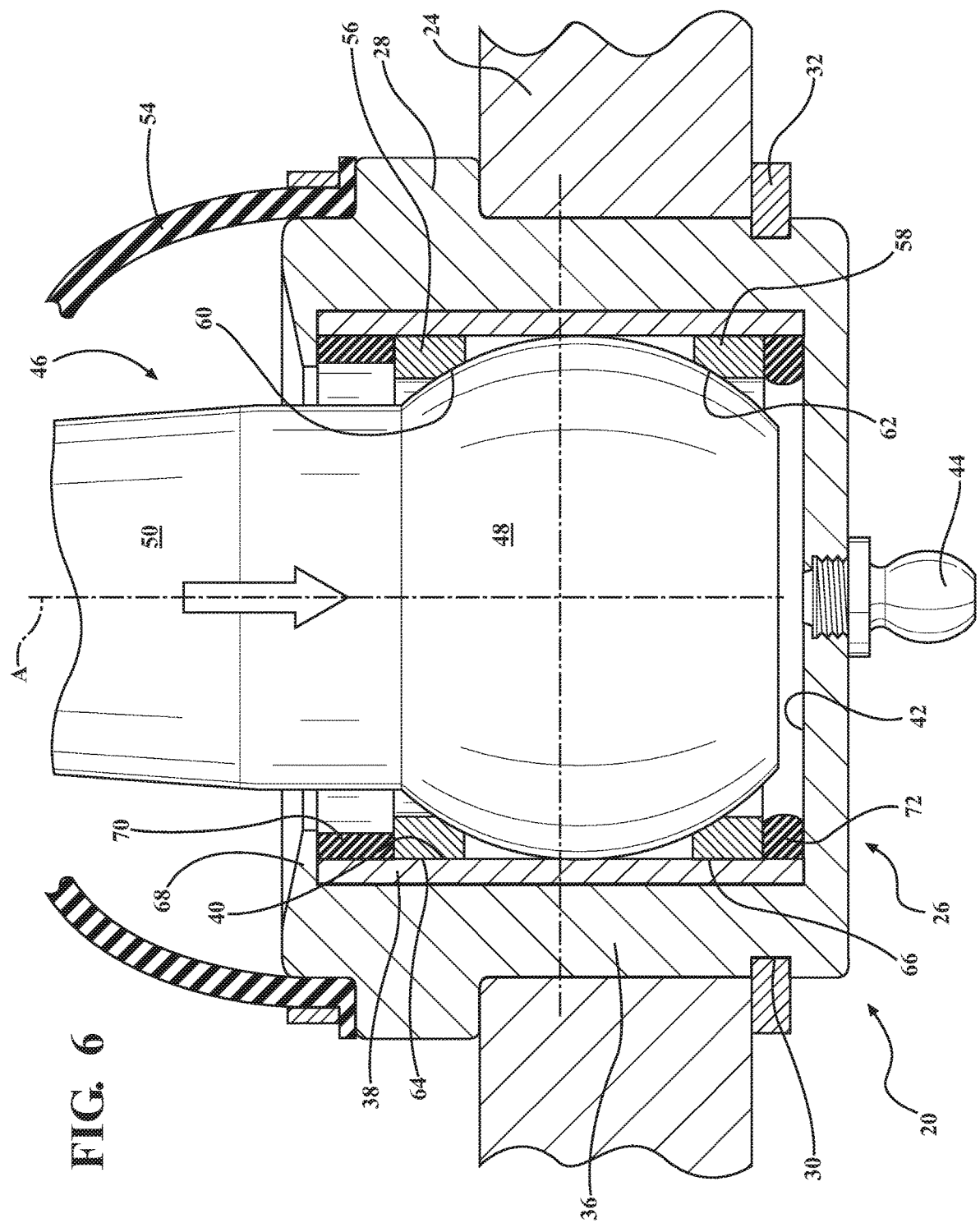
FIG. 6 is another view similar to FIG. 4 but showing the ball stud being moved relative to the housing in an opposite axial direction from FIG. 5.

During installation of the ball joint assembly 20 on a vehicle, the upper and lower biasing elements 70, 72 allow for the axial position of the ball stud 46 to move relative to the housing 26, within constraints established by the biasing elements 70, 72 and the bearings 56, 58, to prevent the ball joint assembly 20 from binding up. For example, FIG. 5 shows the ball stud 46 having been moved closer to the lip 68 of the housing 26, and FIG. 6 shows the ball stud 46 as having been moved closer to the lower wall 42 of the housing 26.

Another aspect of the present invention is related to a method of making a ball joint assembly 20, such as the ball joint assembly 20 shown in FIGS. 1-6 and discussed above. An exemplary embodiment of the method includes the step of preparing the housing 26. The method continues with the step of inserting the lower biasing element 72 into the open bore of the housing 26. The method proceeds with the step of inserting the lower bearing 58 into the inner bore such that its outer bearing surface 66 is in slidable contact with the inner wall 40 of the housing 26. The method continues with the step of inserting the ball portion 48 of the ball stud 46 into the open bore of the housing 26 such that the exterior surface of the ball portion 48 is in slidable contact with the curved lower bearing surface 62 of the lower bearing 58. The method proceeds with the step of inserting the upper bearing 56 into the open bore such that the curved upper bearing surface 60 is in slidable contact with the exterior surface of the ball portion 48 of the ball stud 46 and such that the outer bearing surface 64 of the upper bearing 56 is in slidable contact with the inner wall 40 of the housing 26. The method proceeds with the step of inserting the upper biasing element 70 into the open bore of the housing 26. The method continues with the step of partially closing the open end of the housing 26, such as through swaging, to present the radially inwardly extending lip 68 which traps the ball portion 48 of the ball stud 46, the bearing sleeve 38, the bearings 56, 58 and the biasing elements 70, 72 in the inner bore. The method proceeds with the step of compressing the first and second biasing elements 70, 72 to bias the curved upper and lower bearing surfaces 60, 62 against the exterior surface of the ball portion 48 of the ball stud 46. Preferably, the partial closing of the open end of the housing 26 causes the compression of the first and second biasing elements 70, 72. The exemplary method also includes the steps of operably connecting the housing 26 with the knuckle 24 and with the axle 22.

Figure 7:
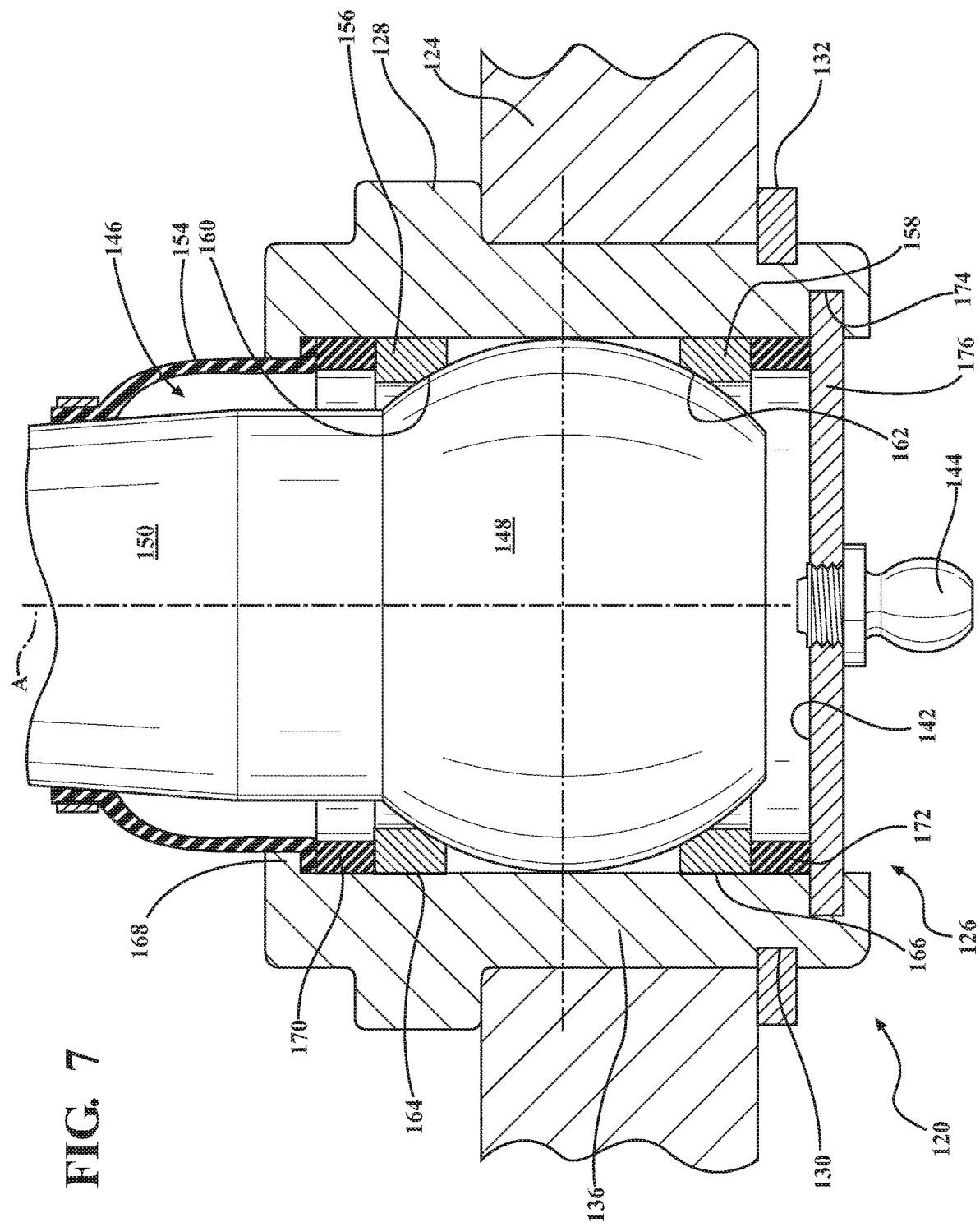
FIG. 7 is a fragmentary view of an alternate embodiment of the ball joint assembly in an installed condition and showing a ball stud and a Zerk fitting in elevation and the remaining components in cross-section.

An alternate embodiment of the ball joint assembly 120 is generally shown in FIG. 7 with like numerals, separated by a prefix of "1" indicating corresponding parts with the first exemplary embodiment. The second embodiment is distinguished from the first embodiment by the housing 126 being made as a single piece of metal, such as gas carbonized AISI 1018 steel. The housing 126 of this alternate embodiment also has two open ends with a radially inwardly extending and machined (not swaged or otherwise deformed) lip 168 at one of the ends and with a circumferential groove 174 formed into the inner wall adjacent the other end. The bearings 156, 158, biasing elements 170, 172 and ball portion 148 of the ball stud 146 are all inserted into the open bore through the open end with the groove 174. A cover plate 176, which starts with a frustoconical shape, is then flattened into engagement with the circumferential groove 174 to close the end of the housing 126 and trap the bearings 156, 158, biasing elements 170, 172 and ball portion 148 in the open bore.

Obviously, many modifications and variations of the present invention are possible in light of the above teachings. It is, therefore, to be understood that within the scope of the appended claims, the invention may be practiced otherwise than specifically described. It should also be appreciated that the terms "upper", "lower" and "bottom" are in reference to the orientations of the enabling embodiment of the invention shown in the Figures and are not meant to require any certain orientation. Additionally, it is to be understood that all features of all claims and all embodiments can be combined with each other, as long as they do not contradict each other.

What is claimed is:

1. A ball joint assembly, comprising:
    a housing with an inner wall which surrounds an open bore that extends along a central axis;
    a ball stud with a ball portion received in said open bore of said housing and with a shank portion projecting out of said open bore through an open end of said housing;
    a pair of bearings disposed in said inner bore of said housing and interposed between said ball portion of said ball stud and said inner wall, each of said bearings having a curved inner bearing surface in surface-to-surface contact with said ball portion of said ball stud for allowing said ball stud and said housing to rotate and articulate relative to one another, and each of said bearings also having an outer bearing surface in slidable contact with said inner wall of said housing;
    a pair of biasing elements biasing said bearings in opposite axial directions against said ball portion of said ball stud such that said ball stud is movable relative to said housing in said axial direction before use of said ball joint assembly; and
    wherein said ball portion is in contact with said inner wall and is slidable in said axial direction along said inner wall before use of said ball joint assembly.

2. The ball joint assembly as set forth in claim 1 wherein said housing includes a bearing sleeve which defines said inner wall.

3. The ball joint assembly as set forth in claim 1 wherein said biasing elements are made of an elastically compressible material.

4. The ball joint assembly as set forth in claim 1 wherein said housing has a lower wall at one end of open bore and wherein one of the biasing elements is sandwiched between a flat surface of one of said bearings and said lower wall of said housing.

5. The ball joint assembly as set forth in claim 4 wherein said housing is deformed to present a radially inwardly extending lip opposite of said lower wall and wherein one of said biasing elements is sandwiched between a flat surface of one of said bearings and said lip of said housing.

6. The ball joint assembly as set forth in claim 1 wherein said inner wall of said housing has a constant diameter along its entire length.

7. The ball joint assembly as set forth in claim 1 further including a cover plate which is secured with said housing and wherein one of said biasing elements is sandwiched between said cover plate and one of said bearings.

8. A method of making a ball joint assembly, comprising the steps of:
    inserting a bearing sleeve of a housing into an opening in a main body piece of the housing wherein the bearing sleeve has an inner wall that surrounds an open bore which extends along a central axis;
    inserting a first biasing element into the open bore;
    inserting a first bearing that has a first curved bearing surface and a first outer surface into the open bore such that the first outer surface is in slidable contact with the inner wall of the housing;
    inserting a ball portion of a ball stud into the open bore such that an exterior surface of the ball portion is in slidable contact with the first curved bearing surface of the first bearing;
    inserting a second bearing that has a second curved bearing surface and a second outer surface into the inner bore such that the second curved bearing surface is in slidable contact with the exterior surface of the ball portion and such that the second outer surface is in slidable contact with the inner wall of the housing;
    inserting a second biasing element into the open bore;
    at least partially closing an open end of the housing;
    compressing the first and second biasing elements to bias the first and second curved bearing surfaces of the first and second bearings against the exterior surface of the ball portion of the ball stud; and
    wherein the ball stud is capable of movement relative to the housing in an axial direction immediately after the step of at least partially closing an open end of the housing.

9. The method as set forth in claim 8 wherein the step of at least partially closing an open end of the housing is further defined as swaging one axial end of the housing to present a radially inwardly extending lip.

10. The method as set forth in claim 9 wherein the first and second biasing elements are made of an elastically compressible material.

11. The method as set forth in claim 9 further including the step of sliding the ball portion of the ball stud along the inner wall of the housing in an axial direction.

12. The method as set forth in claim 8 further wherein the step of at least partially closing an open end of the housing causes the step of compressing the first and second biasing elements.

13. The method as set forth in claim 8 wherein the step of at least partially closing an open end of the housing is further defined as pressing a cover plate into a groove formed into the inner wall of the housing.

14. A method of making a ball joint assembly, comprising the steps of:

preparing a housing that has an inner wall that surrounds an open bore which extends along a central axis;

inserting a first biasing element into the open bore;

inserting a first bearing that has a first curved bearing surface and a first outer surface into the open bore such that the first outer surface is in slidable contact with the inner wall of the housing;

inserting a ball portion of a ball stud into the open bore such that an exterior surface of the ball portion is in slidable contact with the first curved bearing surface of the first bearing;

inserting a second bearing that has a second curved bearing surface and a second outer surface into the inner bore such that the second curved bearing surface is in slidable contact with the exterior surface of the ball portion and such that the second outer surface is in slidable contact with the inner wall of the housing;

inserting a second biasing element into the open bore;

at least partially closing an open end of the housing;

compressing the first and second biasing elements to bias the first and second curved bearing surfaces of the first and second bearings against the exterior surface of the ball portion of the ball stud;

wherein the ball stud is capable of movement relative to the housing in an axial direction immediately after the step of at least partially closing an open end of the housing; and wherein the ball portion is in contact with the inner wall and is slidable in the axial direction along the inner wall before use of the ball joint assembly.

* * * * *